United States Patent [19]

Arvin

[11] 4,103,711
[45] Aug. 1, 1978

[54] FLUID LOGIC FLIP-FLOP

[75] Inventor: Paul Arvin, Bryan, Ohio

[73] Assignee: The Aro Corporation, Bryan, Ohio

[21] Appl. No.: 765,372

[22] Filed: Feb. 3, 1977

[51] Int. Cl.² ............................................. F16K 11/02
[52] U.S. Cl. ........................... 137/625.66; 137/625.26
[58] Field of Search ...................... 137/625.26, 625.49, 137/625.66

[56] References Cited

U.S. PATENT DOCUMENTS

| 3,559,686 | 2/1971 | Hoffman | 137/625.26 X |
| 3,794,075 | 2/1974 | Stoll et al. | 137/625.66 |
| 3,868,969 | 3/1975 | Schwenk | 137/625.5 |
| 3,990,468 | 11/1976 | Arvin et al. | 137/625.66 X |
| 3,995,654 | 12/1976 | Arvin et al. | 137/625.66 X |

FOREIGN PATENT DOCUMENTS

| 2,303,217 | 10/1976 | France | 137/625.66 |
| 2,125,174 | 11/1972 | Fed. Rep. of Germany | 137/625.66 |
| 2,327,320 | 12/1974 | Fed. Rep. of Germany | 137/625.66 |
| 2,337,007 | 2/1975 | Fed. Rep. of Germany | 137/625.66 |

*Primary Examiner*—Gerald A. Michalsky
*Attorney, Agent, or Firm*—Allegretti, Newitt, Witcoff & McAndrews

[57] ABSTRACT

An improved flip-flop fluid logic circuit device is made from a body block having a through bore and adapted to receive a pair of identical inserts, a composite valve member in between the inserts, pressure responsive diaphragm members for engaging the opposite ends of the valve member to drive the valve between extreme positions within the bore and means for sealing the ends of the bore to retain the operating mechanism. A manual override button is included at each end of the bore to operate the composite valve member.

9 Claims, 4 Drawing Figures

FLUID LOGIC FLIP-FLOP

BACKGROUND OF THE INVENTION

This invention relates to an improved fluid logic device and more particularly to an improved construction for a fluid logic flip-flop device.

Fluid logic devices for control of industrial equipment have become increasingly useful recently. Utilization of such devices with pneumatic and hydraulic equipment may eliminate the need for electrical control, thereby eliminating the potential hazard of electric shock and spark. Bouteille in his book "Fluid Logic Controls and Industrial Automation", John Wiley and Sons, 1973, reviews the state of the art of fluid logic control devices. In the Bouteille book, numerous types of logic devices are disclosed including AND, OR or NOT logic devices. Additionally, a so-called memory device is disclosed. The memory device is also known as a "flip-flop" device.

The so-called flip-flop device provides an output signal in response to a pulse or a constant input signal. In other words, the output remains in the "on" state once it has been triggered by an appropriate input signal. The output remains constant even though the input is subsequently turned "off". A positive cancellation signal is required in order to shift the output signal to the "off" position.

Various structures have been developed to provide the flip-flop function. Many of these structures are illustrated in the Bouteille reference. Generally, these structures provide a poppet or sliding D valve mounted in an elongated bore. FIGS. 3–29, 3–30 and 3–31 of the Bouteille reference illustrate various typical embodiments of prior art structures.

While such prior art structures function well, they are often expensive to make. Additionally, the sliding valve members in prior art flip-flop devices are subject to wear. Relatively low shifting pressures compared to supply pressure may result in false signaling. Often, such prior art devices do not have a quick, sharp, snap action feature. Finally, prior art devices often require precise machining operations during manufacture. This may add significantly to the manufacturing cost of the product.

SUMMARY OF THE INVENTION

The present invention comprises an improved fluid logic flip-flop device which overcomes many of the disadvantages found in the prior art. The flip-flop device of the present invention includes a body with a central bore and a plurality of passages into the bore from the outside. A pair of opposed substantially identical inserts are positioned in the bore. The inserts include various valve seats and passageways. A valve member in the shape of a poppet is positioned between the inserts and cooperates with the seats of the inserts. A pressure responsive member at each end of the bore operates to engage and drive the valve member between various seated positions.

It is thus an object of the present invention to provide a moving part, fluid logic flip-flop device which eliminates various disadvantages associated with the prior art.

A further object of the present invention is to provide a fluid logic flip-flop device with a sufficiently high shifting pressure threshold to prevent inadvertent shifting or actuation of the device due to stray fluid pressure pulses in a fluid logic circuit.

Still another object of the invention is to provide a fluid logic flip-flop device with snap acting operation to provide true binary logic pressure signals.

A further object of the present invention is to provide a fluid logic flip-flop device which is inexpensive to manufacture, requires little or no special machining and may be fabricated by inexpensive molding or other processing means.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 2:
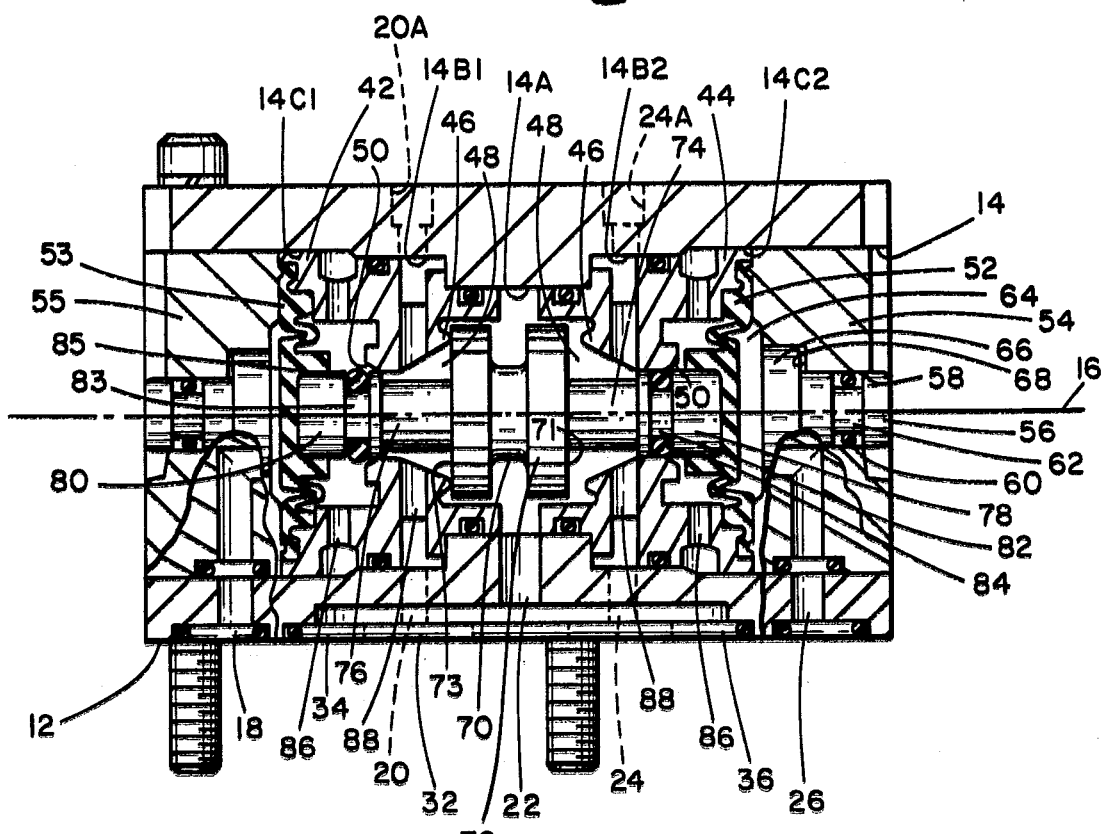
FIG. 2 is a cross-sectional view of the device of FIG. 1 taken substantially along the line 2—2.
Figure 3:
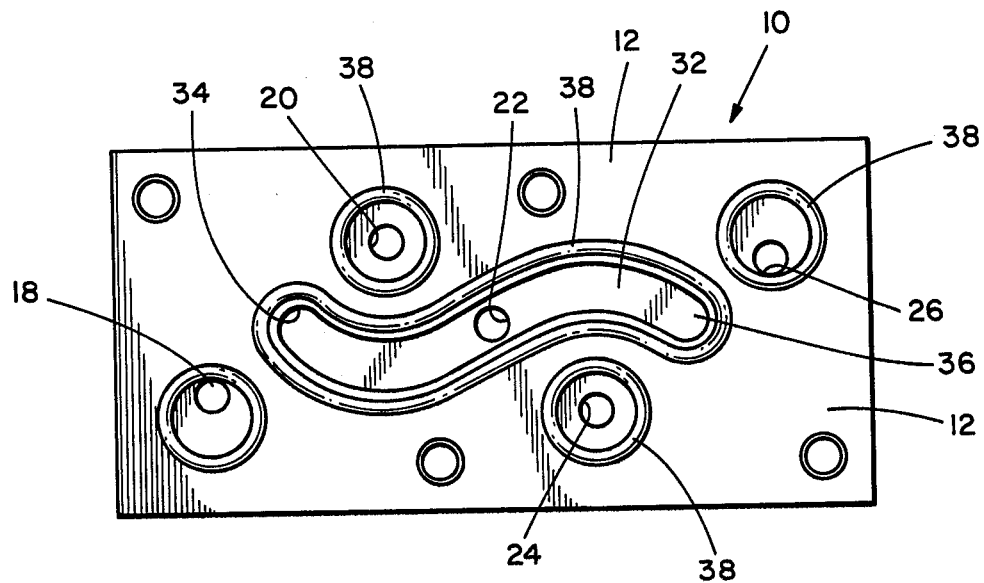
FIG. 3 is a bottom plan view of the inlet surface of the flip-flop device of the present invention.

The flip-flop fluid logic device includes a body block or body 10 which is a generally rectangular parallelpiped having a flat bottom surface 12 as shown in FIG. 3. The body 12 includes a through bore 14 having a centerline axis 16 as illustrated in FIG. 2. The bore is generally cylindrical and symmetrical about the centerline axis 16, though the diameter of the bore 14 varies along the centerline axis as illustrated.

At the center of the bore 14, the bore has a bore section 14A of minimum diameter. The bore sections next adjacent to the bore section 14A are sections 14B1 and 14B2 which have equal diameters greater than the diameter of section 14A. Continuing on in both directions from the bore section 14A, the next adjacent sections of increasing diameter are identified as sections 14C1 and 14C2. The diameters of sections 14C1 and 14C2 are equal.

Figure 1:
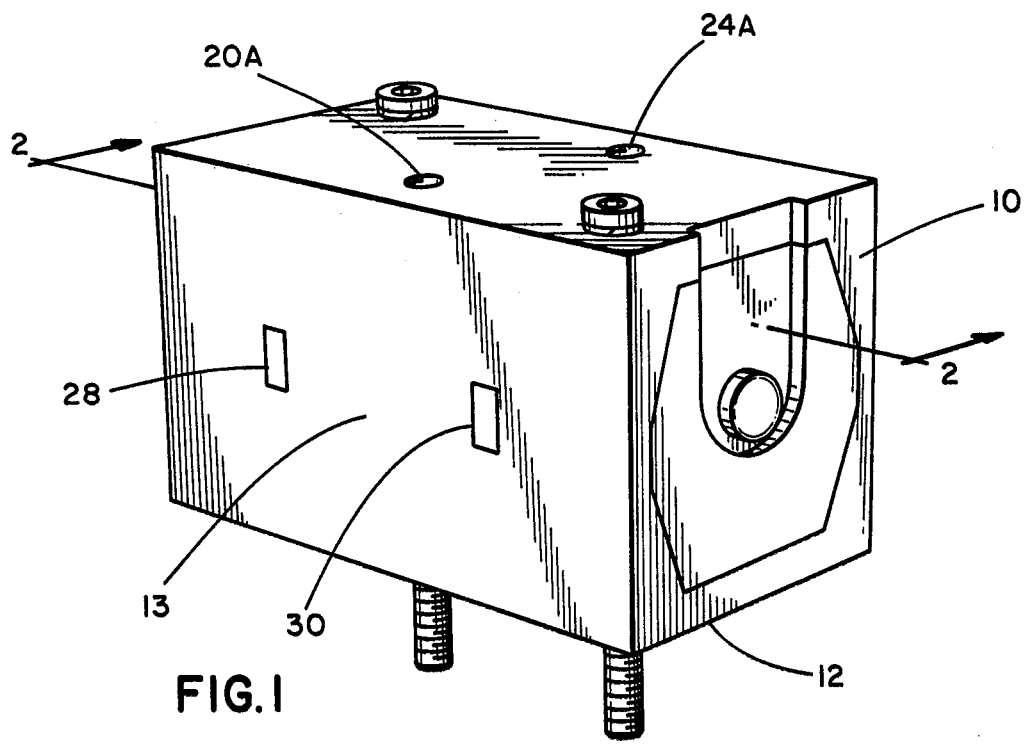
FIG. 1 is a perspective view of the improved flip-flop logic device of the present invention.

Projecting through the wall of the body 10 and extending upward from surface 12 is a series of passages arranged in serial order along the axis 16 and identified as follows: first inlet passage 18, first outlet passage 20, supply inlet passage 22, second outlet passage 24 and second inlet passage 26. A first exhaust passage 28 from the bore 14 extends through the side wall 13 of the body 10 and is positioned intermediate first inlet 18 and first outlet 20 with respect to the axis 16. In similar fashion, a second exhaust passage 30 is positioned intermediate second outlet passage 24 and second inlet passage 26. Note that auxiliary outlets 20A and 24A may be provided on the opposite side of body 10 as shown in FIGS. 1 and 2 for use in place of outlets 20 and 24. Outlets 20A and 24A are threaded to accept a plug or tube fittings.

The center supply inlet passage 22 is connected, by means of a channel 32 defined in the surface 12, to end circuit board connection positions 34 and 36 as illustrated in FIG. 3. Each of the inlet and outlet passages 18, 20, 24 and 26 as well as channel 32 is surrounded by a sealing element such as O ring seal 38 which is retained in a counter bore in surface 12. Bolts 40 which pass through the body 10 then permit sealing attachment of the flip-flop fluid logic device to a circuit board, for example, as shown in U.S. Pat. No. 3,407,833 which is incorporated herewith by reference. It is also possible to use other connection means with the variously described passages to provide fluid circuit connection.

Inserts 42 and 44 are positioned from opposite ends of the bore 14 to the position shown in FIG. 2 within the bore. The inserts 42, 44 are made in accordance with the teachings of U.S. Pat. No. 3,990,468 which is incorporated herewith by reference. The inserts 42, 44 are thus symmetrical about the centerline axis 16. The inserts 42, 44 are positioned within the bore 14 so that they appear as a mirror image of each other.

Like numbers will be used to define the like parts of the inserts 42, 44. Each insert 42, 44 includes a fluid supply seat 46 and a passage or center bore 48 extending from the fluid supply seat 46 along the centerline axis 16 and through the insert 42, 44. This center passage 48 defines a second exhaust valve seat 50 facing in the opposite direction from the fluid supply valve seat 46. Note that with regard to positioning of the insert 44, seat 46 is intermediate supply inlet 22 and outlet 24. With regard to insert 42, seat 46 is intermediate a path between inlet 22 and outlet 20. For insert 44, the exhaust valve seat 50 is intermediate the outlet passage 24 and exhaust passage 30. For insert 42, exhaust valve seat 50 is intermediate outlet 20 and exhaust 28.

A flexible diaphragm member 52 is positioned over the open end of the passage 48 of insert 44 so that fluid pressure from the second supply inlet 26 may act on the diaphragm 52 causing it to flex. The diaphragm 52 is held in position against insert 44 by means of the cover plate 54. Similarly, diaphragm 53 cooperates with insert 42 and has a cover plate 55.

The cover plate 54 also includes a manually actuable override member 56 positioned in a center bore 58 of the plate 54. The override member 56 includes an O-ring seal 60 retained in a groove 62 to prevent escape of air from chamber 64 defined between the cover plate 54 and the diaphragm 52. The flange surface 66 of member 56 cooperates with annular land surface 68 of the cover plate 54 to retain the override member 56 in position and limit the outward travel of that member 56. The outside end of the member 56 may be manually actuated against the diaphragm 52 in order to override or manually actuate the flip-flop device.

A composite valve 70 is positioned between the inserts 42 and 44. The valve 70 is comprised of a center disc portion 72 of a first or major diameter substantially equal to or slightly greater than the diameter of the seat 46. Projecting in opposite directions from the disc 72 along the centerline axis 16 are spacing studs 74 and 76. The studs 74 and 76 terminate respectively with cooperative plunger ends 78 and 80 which engage diaphragms 52 and 53, respectively.

A circumferential groove 82 with an O-ring seal 84 is defined in the stud 74. The seal 84 cooperates with seat 50 of insert 44. Ring 85 in groove 83 of stud 76 cooperates with seat 50 of insert 42.

Radial passages 86 and 88 extend outward from the center of the insert 44 and connect respectively with exhaust 30 and second fluid outlet passage 24. Radial passages 86 and 88 of insert 42 connect respectively with exhaust 28 and outlet 20.

The distance between the sealing surfaces 71 and 73 of the disc 72 is slightly less than the spacing between seats 46 of the respective inserts 42 and 44. Valve surface 71 is spaced by means of the stud 74 from the valve seal 84 a distance greater than the spacing between seats 46 and 50. Valve surface 73 is similarly positioned by stud 76. Note also that the active surface area of the valve seat surface 71 is less than the active surface area of diaphragm 52. Similarly, the area of surface 73 is less than the area of diaphragm 53.

A plane perpendicular to the axis 16 and passing through the center of the supply inlet passage 22 is substantially a mirror plane. Thus, the description given for the second insert 44 and associated parts of the flip-flop device find their mirror image with regard to the first insert 42.

Operation

In operation, supply fluid is constantly provided at supply inlet passage 22. A pulse or pressure signal through control inlet 26 forces the diaphragm 52 and valve 70 to the left. This is the position shown in FIG. 2. When in the position shown in FIG. 2, fluid flows from the inlet 22 past the valve 70 through passage 88 and out passage 24. The exhaust 30 is sealed by virtue of the seal 84 engaging the seat 50. The valve 70 is maintained in the position shown even if the pulse or fluid control pressure is removed from inlet 26. This results because of the active area 71 which is exposed to fluid pressure from the supply inlet 22. That is, pressure on surface 71 maintains the device in configuration illustrated, even if pressure is removed from inlet 26.

To shift the valve to the opposite position or to the right from that shown in FIG. 2, fluid control pressure must be removed from port or passage 26 and a pressure signal must be applied through passage 18. Upon application through the passage 18, the pressure engages the surface of diaphragm 53. Since the area of the diaphragm 53 is greater than the active surface area 71, upon reaching a predefined threshold pressure, the valve 70 is shifted to the right in FIG. 2. Simultaneously, exhaust 28 is sealed and fluid from fluid supply 22 may then pass through pressure outlet 20. The surface 71 then seats against seat 46 closing off supply through the outlet 24. The outlet 24 will then exhaust through passage 88 past seat 50 through passage 86 and out the exhaust 30.

To override or cause manual actuation of the flip-flop device, the member 56 may be manually depressed.

Alternative Embodiment

Figure 4:
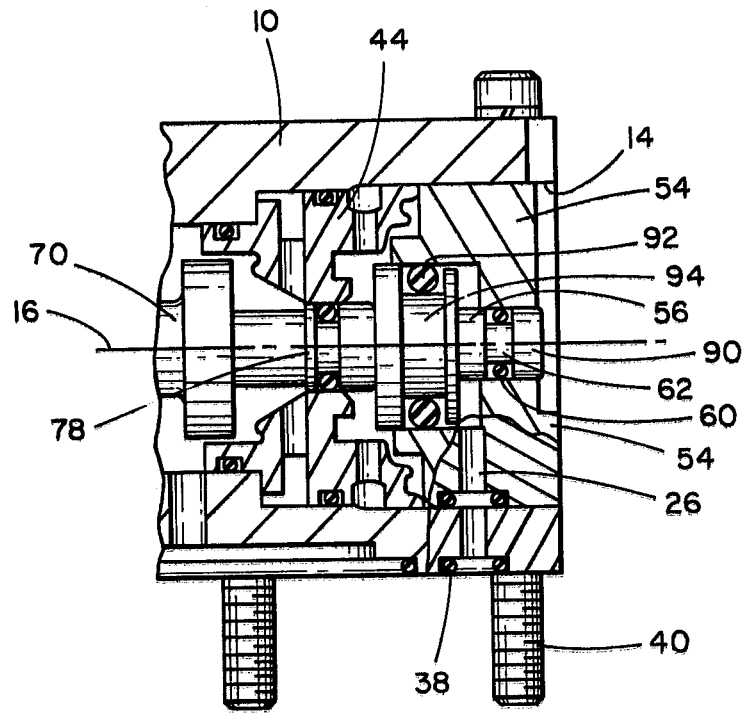
FIG. 4 is a partial cross-sectional view of an alternate construction for the flip-flop device of the present invention.

FIG. 4 illustrates an alternative embodiment for the diaphragm 52, 53. A piston member 90 has been substituted for the diaphragm 52, 53. Thus, diaphragm 52 of FIG. 2 is replaced by the composite manual actuation member and piston member 90 in FIG. 4. The piston member 90 includes a cup seal 92 retained in a circumferential groove 94. Fluid pressure through inlet 26 acts against the piston member 90 and thence against the end 78 of the valve 70. Note that in the embodiment of FIG. 4, the manual override member 56 is integrally molded with the piston member 90.

While there has been set forth a preferred embodiment of the present invention, it is to be understood that the invention shall be limited only by the following claims and their equivalents.

What is claimed is:

1. An improved flip-flop fluid logic device comprising, in combination:

a body having a through bore with a centerline axis, a plurality of passages through the body and connected to the bore, said passages including at least the following in serial order along the axis: first inlet passage, first exhaust passage, first outlet passage, supply inlet passage, second outlet passage, second exhaust passage, and second inlet passage;

first and second identical inserts positioned in fixed opposed relation in said bore, said first insert defining an internal fluid passage along the axis between the first exhaust passage, the first outlet passage, and the supply inlet passage and including an exhaust valve seat intermediate the first exhaust passage and first outlet passage and also including a supply valve seat intermediate the first outlet and the supply inlet passage, said second insert similarly positioned with respect to said second exhaust passage, second outlet passage and supply inlet passage;

a composite valve positioned intermediate the inserts, said valve comprising four valve members, one for cooperation with each seat of the two inserts, said valve members being rigidly connected and spaced from one another to seat one pair of said valve members against the supply valve seat of the first insert and the exhaust valve seat of the second insert or to seat the remaining pair of said valve seat members against the supply valve seat of the second insert and the exhaust valve seat of the first inserts, said valve members for engaging the exhaust valve seat including ring seal means for engaging the respective exhaust valve seats, said valve members for engaging the supply valve seats being substantially a planar surface;

first fluid pressure responsive means intermediate the first inlet passage and first exhaust passage, said first fluid pressure responsive means being mechanically connected with the composite valve to displace said valve along the axis in response to fluid pressure through the first inlet passage, said first fluid pressure means having an effective surface area greater than the effective surface area of the valve member associated with the supply valve seat of the second insert;

second fluid pressure responsive means intermediate the second inlet passage and the second exhaust passage, said second fluid pressure responsive means being mechanically connected with the composite valve to displace said valve along the axis in response to fluid pressure through said second supply inlet, said second fluid pressure means having an effective surface area greater than the effective surface area of the valve member associated with the supply valve seat of the first insert; and means for sealing the opposite ends of the bore and providing a chamber for fluid pressure to effect operation of the fluid pressure responsive means in response to fluid pressure through the first or second supply inlet.

2. The improved device of claim 1 wherein said composite valve comprises a disc member defining two spaced valve surfaces of a major diameter substantially equal to the diameter of the supply valve seats and positioned intermediate the supply valve seats, the distance between the surfaces being less than the axial distance between the supply valve seats; and oppositely extending axial rod projections on opposite sides of the disc member each rod member extending axially into the internal passage of one of the inserts, each rod member including a valve member incorporated therewith and spaced from the surface of the disc member for cooperation with one of the exhaust valve seats.

3. The improved device of claim 1 wherein said fluid pressure responsive means comprise a diaphragm positioned over the axial passage through said insert, said diaphragm cooperatively engaging the composite valve for driving said valve in response to fluid pressure on the side of the diaphragm opposite the composite valve.

4. The improved device of claim 1 wherein said fluid pressure responsive means comprise a piston member mounted for movement axially in the means for sealing the bore, said piston being sealingly mounted and responsive to pressure thereon through one of the supply inlets and being axially engageable with the valve member to drive the valve member in a desired axial direction.

5. The improved device of claim 1 wherein said body includes a planar surface through which the inlet and outlet passages extend.

6. The improved device of claim 5 wherein said passages include sealing means at said flat surface whereby said flat surface may be sealingly attached to circuit board means.

7. The improved device of claim 1 wherein said through bore is comprised of a series of connected bore sections of increasing diameter toward the ends of said body and wherein said insert is dimensioned to be slidably received by said shaped bore.

8. The improved device of claim 1 including means disposed at each end of said bore for engaging the pressure responsive means, said means for engaging being manually responsive to override the biasing force imparted through the pressure responsive means to the composite valve.

9. An improved flip-flop fluid logic device comprising, in combination:

a body having a through bore with a centerline axis, a plurality of passages through the body and connected to the bore, said passages including at least the following in serial order along the axis: first inlet passage, first exhaust passage, first outlet passage, supply inlet passage, second outlet passage; second exhaust passage, and second inlet passage;

first and second identical inserts positioned in fixed opposed relation in said bore, said first insert defining an internal fluid passage along the axis between the first exhaust passage, the first outlet passage, and the supply inlet passage and including an exhaust valve seat intermediate the first exhaust passage and first outlet passage and also including a supply valve seat intermediate the first outlet and the supply inlet passage, said second insert similarly positioned with respect to said second exhaust passage, second outlet passage and supply inlet passage;

a composite valve positioned intermediate the inserts, said valve comprising four valve members, one for cooperation with each seat of the two inserts, said valve members being rigidly connected and spaced from one another such that one pair of said valve members seats against the supply valve seat of the first insert and the exhaust valve seat of the second insert or the remaining pair of said valve members seats against the supply valve seat of the second insert and the exhaust valve seat of the first insert;

first fluid pressure responsive means intermediate the first inlet passage and first exhaust passage, said first fluid pressure responsive means being mechanically connected with the composite valve to displace said valve along the axis in response to fluid pressure through the first inlet passage, said first fluid pressure means having an effective surface area greater than the effective surface area of the valve member associated with the supply valve seat of the second insert;

second fluid pressure responsive means intermediate the second inlet passage and the second exhaust passage, said second fluid pressure responsive means being mechanically connected with the composite valve to displace said valve along the axis in response to fluid pressure through said second supply inlet, said second fluid pressure means having an effective surface area greater than the effective surface area of the valve member associated with the supply valve seat of the first insert;

said fluid pressure responsive means comprising a separate piston member mounted for movement axially in the means for sealing the bore at each end, each of said pistons being sealingly mounted and responsive to pressure thereon through one of the supply inlets and being axially engageable with the valve member to drive the valve member in a desired axial direction; and means for sealing the opposite ends of the bore and providing a chamber for fluid pressure to effect operation of the fluid pressure responsive means in response to fluid pressure through first or second supply inlet.

* * * * *